United States Patent
McCormick

[15] 3,687,130
[45] Aug. 29, 1972

[54] INSTRUMENT TO MEASURE PULMONARY FUNCTION

[72] Inventor: James B. McCormick, Hinsdale, Ill.
[73] Assignee: Pelam Inc., Hinsdale, Ill.
[22] Filed: Nov. 26, 1969
[21] Appl. No.: 880,161

[52] U.S. Cl. ................................128/2.08, 73/204
[51] Int. Cl. ..............................................A61b 5/08
[58] Field of Search ...............128/2.08, 2.07; 73/204

[56] References Cited

UNITED STATES PATENTS

| | | | |
|---|---|---|---|
| 1,257,568 | 2/1918 | Wilson | 73/204 |
| 1,769,358 | 1/1930 | Pinkerton et al. | 73/204 |
| 2,583,561 | 1/1952 | General et al. | 73/204 |
| 2,831,181 | 4/1958 | Warner | 340/213 |
| 3,081,766 | 3/1963 | Dubsky et al. | 128/2.08 |
| 3,232,288 | 2/1966 | Krobath | 128/2.08 |

FOREIGN PATENTS OR APPLICATIONS

| | | | |
|---|---|---|---|
| 712,351 | 7/1931 | France | 73/204 |
| 1,105,567 | 7/1955 | France | 128/2.08 |
| 1,086,742 | 10/1967 | Great Britain | 73/204 |
| 1,134,753 | 11/1968 | Great Britain | 128/2.08 |

OTHER PUBLICATIONS

Amer. Journ. of Medical Electronics, July– Sept, 1963, pp. 207– 211.
Journal of Scientific Instruments (England) Vol. 32, No. 4 Apr. 1955, pp. 145– 147.

*Primary Examiner*—Kyle L. Howell
*Attorney*—Fitch, Even, Tabin & Luedeka

[57] ABSTRACT

The respiratory volume measuring instrument includes means defining a passageway which is adapted so that a patient can exhale into one end thereof. Disposed in the passageway is a measuring element of a means for measuring the flow-rate of air passing through the passageway. The flow-rate measuring means is connected to an integrating means which integrates the readings of the measuring means. The integrating means is connected, in turn, to an indicating means which indicates the output of the integrating means, and hence, the volume of air per unit time exhaled by the patient through the passageway. The volume of air exhaled in one second is an important index of function for the lungs.

2 Claims, 1 Drawing Figure

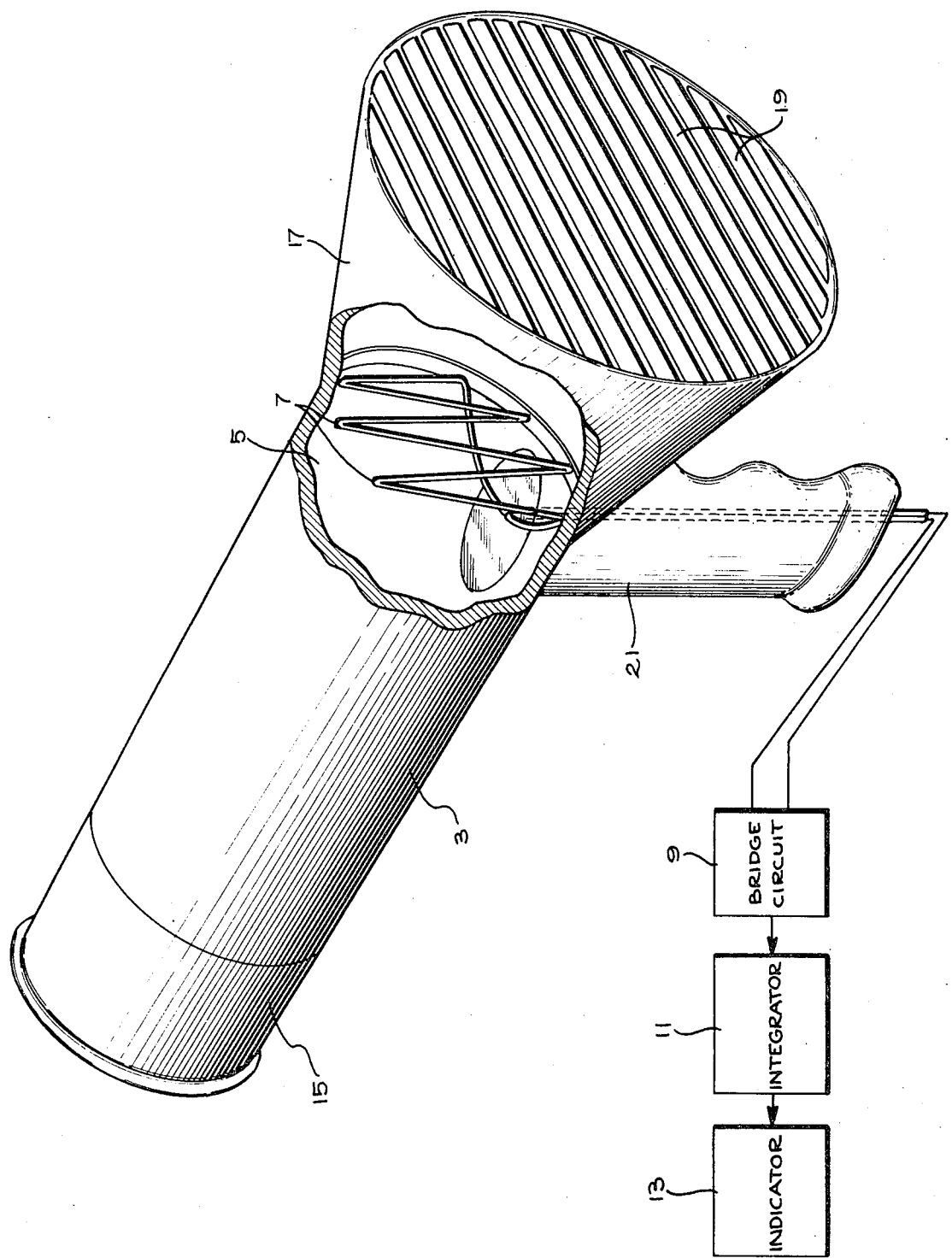
INVENTOR
James B. McCormick

INSTRUMENT TO MEASURE PULMONARY FUNCTION

The present invention relates to an instrument for measuring a pulmonary function, and more particularly, to an instrument for measuring the respiratory volume of an individual per unit time.

In order to detect chronic degenerative diseases at an early stage, it is quite common to subject an individual to a battery of tests and to retest him periodically for signs of change. One of the desirable tests of the individual's pulmonary respiratory system is the measurement of respiratory volume, i.e., the volume of air per unit time which the lungs are capable of expiring, for example, in a single breath. Previous instruments for measuring respiratory volume have been complicated and have not been suitable for mass population screening.

An object of the present invention is the provision of an improved instrument for measuring the respiratory volume of an individual. Another object is the provision of a respiratory volume testing instrument which is easy to use, is suitable for mass population screening and produces calibrated and standardized output signals suitable for use in a data collection system.

Other objects and advantages of the present invention will become apparent by reference to the following description and accompanying drawing, the single FIGURE of which shows a schematic diagram of the respiratory volume measuring instrument in accordance with the present invention.

Generally, in accordance with the present invention, the respiratory volume measuring instrument includes means 3 defining a passageway 5 which is adapted so that a patient can exhale into one end thereof. Disposed in the passageway 5 is a measuring element 7 of a means 9 for measuring the flow-rate of air passing through the passageway 5. The flow-rate measuring means 9 is connected to an integrating means 11 which integrates the readings of the measuring means against time. The integrating means 11 is connected, in turn, to an indicating means 13 which indicates the output of the integrating means 11, and hence, the volume of air exhaled by the patient through the passageway per unit time.

More particularly, in the illustrated respiratory volume measuring device, passageway defining means 3 is a tube which is provided at one end with a flexible mouthpiece 15 which is of sufficient size to cover the mouth of the patient and sufficiently flexible to provide an airtight seal when pressed against the face in surrounding relation to the mouth. Preferably, the internal diameter of the tube 3 and mouthpiece is made slightly larger than the larger dimension of the mouth so as not to restrict airflow and yet be small enough in area to provide sufficient airflow-rate to actuate the measuring means 9. The length of the tube should be sufficient to eliminate swirls in the expired air before the air reaches the measuring means 9.

The flow-rate of the exhaled air is measured by the flow-rate measuring means 9, the measuring element 7 of which is disposed adjacent the other end of the tube 3. The measuring means 9 should be capable of measuring relatively low levels of flow-rate and, in the illustrated embodiment, the measuring means is a hot wire anemometer. The measuring element 7 is a thermal sensitive grid filament preferably disposed completely across the passageway 5 so as to indicate the average flow-rate. The mesh of the grid should be large so as not to cause a substantial pressure drop. The grid filament 7 is connected into one leg of a resistance bridge 9 which has a constant direct current applied thereto. The current is made sufficient to heat the grid filament to a temperature substantially above the normal body temperature so that minor temperature variations in the air expired by the patient have minor effects on the reading of the measuring means 9. In certain applications, where ambient temperature affects the reading, a reference thermal sensitive resistor (not shown) which is unheated may be disposed in the passageway 5 and connected to the bridge circuit 9 to compensate for temperature variations. In such applications the grid filament 7 is heated by a separate element rather than by internal current flow. The bridge circuit 9 also includes suitable amplifiers (not shown) to amplify the unbalance in the bridge.

The output of the amplifiers is connected to the integrating means 11 which converts the flow-rate measurement provided by the bridge circuit 9 into a quantity or volume measurement. The integrating means 11 may include an RC integrating circuit. Alternately, the output from the amplifier may be digitized, i.e., the analog output of the amplifier may be converted into a proportional pulse rate in a voltage-to-pulse rate converter and these pulses may be counted over a fixed sample period of one second.

The integrated flow-rate reading at the output of the integrator 11 is read by the indicating means 13 which may be a meter and a timer. The timer allows the integrated output for a one second period to be indicated by the meter. Where a permanent record is desired, the indicating means may include a recorder and a timer. The indicating means 13 is calibrated and standardized so that it indicates actual volume.

The downstream end of the tube 3 is connected to a conical extension 17 which permits the expired air to expand in volume so as to offer minimum residual system resistance. A screen or fluting 19 is provided over the downstream end of the extension 17 to discourage ambient air currents from entering the tube and disturbing the reading of the measuring means 9. A handle 21 is attached to the tube for convenience in handling the instrument.

In operation, the patient inhales and exhales to his maximum ability a few times to exercise his lungs, and then the patient puts his mouth in the mouthpiece 15 and exhales the contents of his lungs into the tube 3. The air, which is exhausted at a temperature of approximately 98° F., flows across the thermal sensitive grid 7 which is stabilized at a temperature considerably above body temperature. The cooling effects of the expired air upon this grid 7 increases the resistance of the thermal sensitive grid in proportion to the flow-rate of air flowing over the surface of the grid 7. The tube 3 provides approximately zero resistance to the exhausted air.

As can be seen from the above, an improved respiratory volume testing instrument is provided which is simple to use and yet provides an accurate measurement of the respiratory volume of the individual. Also, the instrument is relatively inexpensive and is suitable for population screening of pulmonary functions.

Various changes and modifications may be made in the above-described respiratory volume testing instrument without deviating from the spirit or scope of the present invention. Various features of the invention are set forth in the accompanying claims.

What is claimed is:

1. A portable instrument for indicating the respiratory volume of a patient, comprising
   means for defining an air passageway,
   a mouthpiece connected to one end of said passageway defining means, the internal dimensions of the mouthpiece and air passageway being such as to not restrict the flow of air expired by the patient through the air passageway,
   a diverging air passageway extension connected to the other end of said passageway defining means to substantially eliminate back pressure,
   a flow rate measuring means including a measuring element comprising a thermal sensitive grid filament disposed across the passageway, said filament being responsive to the average flow rate of the expired air passing through said passageway,
   integrating means connected to the output of said measuring means for integrating the flow rate reading per unit time of the measuring means,
   indicating means connected to the integrating means for indicating the integrated output of the integrating means to thereby provide an indication of the volume of air expired by the patient per unit time, and
   means for heating the measuring element above normal body temperature to minimize the effects on the measuring element of minor temperature variations of the expired air.

2. An instrument in accordance with claim 1 comprising means disposed over the open end of said extension opposite the end connected to said passageway to discourage ambient air currents from entering the air passageway.

* * * * *